US008428914B2

(12) United States Patent
Frochte

(10) Patent No.: US 8,428,914 B2
(45) Date of Patent: Apr. 23, 2013

(54) METHOD AND SIMULATOR FOR REAL-TIME CALCULATION OF STATE VARIABLES OF A PROCESS MODEL

(75) Inventor: Jorg Frochte, Paderborn (DE)

(73) Assignee: dSPACE Digital Signal Processing and Control Engineering GmbH, Paderborn (DE)

( * ) Notice: Subject to any disclaimer, the term of this patent is extended or adjusted under 35 U.S.C. 154(b) by 1111 days.

(21) Appl. No.: 12/185,203

(22) Filed: Aug. 4, 2008

(65) Prior Publication Data

US 2009/0299498 A1 Dec. 3, 2009

(30) Foreign Application Priority Data

May 29, 2008 (EP) ..................................... 08009808

(51) Int. Cl.
*G06F 7/60* (2006.01)
*G06F 17/10* (2006.01)

(52) U.S. Cl.
USPC ............................................................ 703/2

(58) Field of Classification Search .............. 703/2, 7–8, 703/10
See application file for complete search history.

(56) References Cited

U.S. PATENT DOCUMENTS

| | | | | |
|---|---|---|---|---|
| 5,748,847 A * | 5/1998 | Lo | ................................... | 706/14 |
| 5,859,773 A * | 1/1999 | Keeler et al. | .................... | 700/44 |
| 6,768,967 B2 | 7/2004 | Johnson et al. | | |
| 6,799,194 B2 * | 9/2004 | Grosz et al. | ........................ | 703/2 |
| 6,826,521 B1 * | 11/2004 | Hess et al. | ....................... | 703/12 |
| 7,610,183 B2 * | 10/2009 | Danko | ............................. | 703/2 |
| 7,904,280 B2 * | 3/2011 | Wood | ................................ | 703/2 |
| 2002/0177983 A1 | 11/2002 | Maker | | |

FOREIGN PATENT DOCUMENTS

JP       11-007314       1/1999

OTHER PUBLICATIONS

European Search Report, European Application No. 08009202.0-2206, published by the European Patent Office, dated Oct. 10, 2008, 9 pages.
Zhao et al., "A Flexible Virtual System for Real Time Simulation and Evaluation of Motor Drives", IEEE 199 International Conference on Power Electronics and Drive Systems, PEDS'99, Jul. 1999, Hong Kong, pp. 361-365.
Tummescheit, Hubertus, "Hardware-in-the-Loop Simulation and Analysis", Nov. 2003, retrieved from https://www.cds.caltech.edu/help/uploads/wiki/files/12/HIL-DGC100.pdf, 16 pages.
Schiela et al., "Mixed-mode Integration for Real-time Simulation", Modelica Workshop 2000 Proceedings, Oct. 24, 2000, pp. 69-75.

(Continued)

*Primary Examiner* — Eunhee Kim
(74) *Attorney, Agent, or Firm* — Cesari and McKenna, LLP

(57) ABSTRACT

A method for real-time calculation of state variables ($x_M$) of a process model on a process computer with a first calculating unit and a process interface, wherein the computer is designed so that at least one state variable of a physical process can be received by the computer using the interface and/or at least one output variable for controlling the process can be issued by the computer, wherein the model is calculated by the first calculating unit with an explicit integration method for determining the state variables. According to this method, a second calculating unit is provided, the model is carried out with the second calculating unit using an implicit integration method essentially simultaneously with the calculation of the model with the first calculating unit and the state variables ($x_{M,i}$) calculated with the second calculating unit and the implicit method are used as state variables ($x_M$) of the model.

8 Claims, 4 Drawing Sheets

OTHER PUBLICATIONS

Jung et al., "Step-wise Combined Implicit-Explicit Finite-Element Simulation of Autobody Stamping Processes", Journal of Material Processing Technology 83 (1998), pp. 245-260.

Ing-Ray Chen, "On Applying Imprecise Computation to Real-Time AI Systems", The Computer Journal, vol. 38, No. 6, 1995.

* cited by examiner

METHOD AND SIMULATOR FOR REAL-TIME CALCULATION OF STATE VARIABLES OF A PROCESS MODEL

BACKGROUND OF THE INVENTION

Field of the Invention

The invention relates to a method for the real-time calculation of state variables of a process model on a process computer with a first calculating unit and a process interface, wherein the process computer is designed so that at least one state variable of a physical process can be recorded by the process computer using the process interface and/or at least one output variable for controlling the physical process can be issued by the process computer, wherein the process model is calculated by the first calculating unit with an explicit integration method for determining the state variables. Furthermore, the invention relates to a further similar method and a simulator for carrying out said method.

In particular, the above-said method for real-time calculation of state variables of a process model as well as simulators that carry out such methods are practically commonplace in the fields of mechatronics and process automation. Normally, the process computer or, respectively, the simulator is connected to a real physical process via its process interface, so that state variables of the physical process can be received—by means of measuring—by the process computer or, respectively, the simulator and the process computer or, respectively, the simulator can control the real physical process via the process interface by issuing output variables.

There are multiple applications for a process computer or, respectively, a simulator that, for example, can be categorized according to the type of process model that is carried out by the process computer or, respectively, the simulator.

If control algorithms are primarily implemented on the process computer, the process computer is, for the most part, a control device, wherein the process model can be a part of the implemented control algorithm as is the case, for example, in the decoupling of—linear or also non-linear—multiple variable systems. A typical application here is the control unit design, that—depending on which authoring tool is used—can, for example, be carried out in line with so-called rapid control prototyping (RCP).

In other, more frequently occurring applications, a mathematical model of a technical process is calculated by the process computer as a process model such as e.g. the mathematical model of the engine or the transmission of an automobile. This process model is connected with a "real" physical-technical process via the process interface of the process computer, in the case of the described automobile, usually a control device that is to be tested for functionality; presently perhaps an engine control unit. The control device is loaded with the relevant signals (e.g. RPM, camshaft position, etc.) from the output variables of the process model and the control device reacts with determined state variables—state variables of the physical process—that at least partly affect the process computer via the process interface. In this application, the process computer is frequently called a simulator. The simulator can also function as an open-loop by not having any state variables of the physical process affect it.

It is apparent from the previous examples, that the terms "process computer" and "simulator" both similarly denote digital sample and calculating instruments that can be used to calculate a process model. Should the term "process computer" or "simulator" be used in the following, it is done in context of common language use, however, in the following the terms are normally interchangeable in terms of function. When the test object—here the real process—forms a sort of control loop with the simulator, it is often called an "in-the-loop" simulator, in the current example, a hardware-in-the-loop simulator.

The process models calculated on the process computer are mathematical descriptions of physical-technical systems by differential equations. The differential equations are equations in the time-dependent state variables of the process model, wherein the differential equations are linked by common state variables. Known numerical integration methods are used for the numerical solution of the process model, i.e. for the determination of state variables. These integration methods can be separated into different factors and can, for example, be classified into explicit and implicit methods as well as single- and multiple-step methods.

The integration methods are initially common in that the state variables of a process model are only calculated in certain discrete points, i.e. the state variables do not exist as a continual function $x_M(t)$, rather as discrete temporal grid points $x_M(t_k)$. Values for the state variables $x_M$ of the process model calculated with an integration method in a grid point are always flawed by procedural error and, thus, only represent an approximation of the actual value of the state variables $x_M$. The goal of each numerical integration is to determine a prospective value for the point in time $t_{k+1}$ of the state variable $x_M$—i.e. the state variable $x_{M,k+1}$—, wherein this is generally applied:

$$x_{M,k+1} = x_{M,k} + f(x\dot{Y}_{M,k+1}, x_{M,k}, x\dot{Y}_{M,k}, x_{M,k-1}, \ldots) \qquad (1)$$

An explicit integration method exists when the new value to be calculated of the state variables $x_M$ at point $t_{k+1}$—i.e. $x_{M,k+1}$—is calculated only on the basis of temporally previous values $x_{M,k}$ and $-x_{M,k}$, etc., i.e. the function f can only be conveyed by these values. Calculation of state variables $x_{M,e}$ using an explicit integration method at discrete previous points occurs recursively as a function of previous values of the state variables and their derivation or derivations. Either a single- or also a multiple-step method is referred to depending on how many steps back the values of the state variables are needed; this is similarly the case for implicit integration methods.

An implicit integration method exists—as is shown in Equation 1—when the function f itself is dependent on the current state variables to be determined—or, respectively, their derivation or derivations. As is generally known, such dependencies can numerically only be solved using iterations, which, as a result, means that an iteration loop has to be run within the numerical integration step, which is not necessary in explicit integration methods. The iteration for determining the state variables $x_{M,i}$ calculated with the implicit method is generally aborted when consecutive calculated approximations differ less than a predetermined maximum value, i.e. until it is below a given margin of error.

Explicit integration methods have the advantage that the number of required steps for calculating a current state variable $x_{M,e}$ is generally known and nearly constant, so that it can be sure that current values of the state variable $x_M$ exist for certain foreseeable points. This is very important for all real-time applications, since time-discrete sample systems would otherwise not be viable. A disadvantage of explicit methods is, however, that the accuracy of the calculations is afflicted with uncertainties and, in particular in stiff systems—i.e. systems with strongly differing eigenvalues—, acceptable calculation results can only be achieved when the step sizes of the explicit numerical integration method are kept sufficiently small. In stiff systems, the step sizes of the explicit integration method have to be made so small, that a calculation with real-time conditions is no longer possible.

Implicit integration methods, on the other hand, have the advantage that the accuracy of calculation can be preset exactly by specifying a margin of error, however, this goes hand in hand with the disadvantage that it is not known how many iterations are required in each iteration step in order to calculate a result with the specified accuracy. Implicit integration methods are, thus, in particular in stiff systems, only suitable with limitations for the discussed real-time applications.

SUMMARY OF THE PRESENT INVENTION

Thus, the object of the present invention is to prevent—at least partially—the presented disadvantages in the known method for real-time calculation of state variables of a process model, in particular to ensure the real-time capability of the calculation while guaranteeing as much as possible the numerical accuracy and stability of the calculation.

The method according to the invention for real-time calculation of state variables of a process model on a process computer, which is connected to a real, physical process, is, according to a first teaching of the invention, fundamentally characterized in that a second calculating unit is provided, the process model is carried out with the second calculating unit using an implicit integration method essentially simultaneously with the calculation of the process model with the first calculating unit, the state variables of the process model calculated with the second calculating unit and the implicit method are used as a basis for correcting the calculations of the process model carried out on the first calculating unit and the state variables determined in this manner with the explicit integration method are used as state variables of the process model.

The method according to the invention takes advantage of process computers increasingly having hardware equipment with multiple calculating units, either in the form of multiprocessor systems, which have multiple processors distinguishable as components, or in the form of multicore processors, in which a processor contains multiple cores working as independently as possible from one another, which can effectively process different operations simultaneously and not only sequentially one after the other—with a loss of time—in the form of individual threads.

When it is said that the process model is carried out with the second calculating unit using an implicit integration method "essentially" simultaneously with the calculation of the process model with the first calculating unit, it is meant that the methods are carried out as simultaneously to one another as the differences in the hardware and method will allow. For example, it is possible that explicit and implicit integration methods lead to calculations of the state variables $x_{M,e}$ or, respectively, $x_{M,i}$ with different—i.e. slightly shifted to one another—calculated points in time, nevertheless, the calculations of the process model can be seen as being "essentially" simultaneously carried out for the purpose of the invention, since they both relate to the same physical time and have a common physical time base.

Since the state variables $x_{M,e}$ calculated using the explicit method are used as state variables $x_M$ of the process model, it is first ensured that the real-time conditions can be kept during the calculation of the state variables of the process model. It can additionally be ensured that errors of the explicit integration method do not arbitrarily accumulate by correcting the state variables $x_{M,e}$ calculated with the explicit integration method using the state variables $x_{M,i}$ calculated with the implicit integration method. Here, it is not necessary that such a correction takes place in each step of the explicit method, although it is advantageous to conduct such corrections as often as possible.

According to a particularly advantageous embodiment of the invention, the previous state variables $x_{M,i}$ calculated by the second calculating unit—insofar as they exist—are used to calculate the current state variables $x_{M,e}$ with the first calculating unit. The explicit integration method is—as far as is possible—operated here with the more exact data of the implicit integration method. If the state variables $x_{M,i}$ calculated with the implicit integration method are not completely available, because, for example, the implicit integration method could not be duly terminated, the missing state information must be taken from the explicit integration method.

According to a further, independent teaching of the invention, the object derived and disclosed above is met in that a second calculating unit is provided, the process model is carried out with the second calculating unit using an implicit integration method essentially simultaneously with the calculation of the process model with the first calculating unit, that the state variables calculated with the second calculating unit and the implicit method are used as state variables of the process model, insofar as the state variables calculated with the second calculating unit and the implicit method exist in real time and otherwise, the state variables calculated with the explicit integration method are used as the state variables of the process model.

In this method according to the invention, the explicit integration method operating on the first calculating unit serves as a back-up for calculating the process model, namely in the case of the implicit integration method not being duly terminated, i.e. it cannot deliver the desired results in real time. In the case that the implicit integration method on the second calculating unit cannot keep the real-time conditions, the alternative results of the explicit integration method will be drawn upon on the first calculating unit. Of course, it is possible that the explicit integration method on the first calculating unit is given the state variables $x_{M,i}$ of the implicit integration method, so that good accuracy also of the explicit integration method can be guaranteed.

In an advantageous embodiment of the method according to the invention, the implicit integration method implemented on the second calculating unit works—at least partially—with a greater sample step size as the explicit integration method implemented on the first calculating unit, wherein it is particularly preferred that the sample step size of the implicit integration method is variable, namely as a function of the state variables $x_M$ or, respectively, is adapted according to the temporal changes of these state variables. In such applications in which the state variables $x_M$ of the process model have to be available in a fixed time pattern, i.e. at a constant sampling rate, the available state variables $x_{M,i}$ of the implicit integration method having a variable calculating step size can be phased in that state variables lying between two calculated sample points on the second calculating unit are calculated by interpolation, in particular using a polynomial approximation function of the process model or parts of the process model, in particular using a dense output method. If the sample step sizes of the implicit integration method do not vary too much from the sample step sizes of the explicit integration method, simple—i.e. linear—interpolation leads to a suitable result in the determination of state variables of the process model between two calculation steps.

In the case of larger deviations or increased requirements in the accuracy of the implicit method, a polynomial approximation of the process model between the sample step sizes is suggested. Using the known dense output method, it is possible to calculate practically any points of time of the state variables of the process model lying between to sample points with high accuracy.

A particular difficulty in the use of the implicit integration method is that in order to calculate the prospective state variables—i.e. the state variables at point $t_{k+1}$—state variables $x_P$ of the physical process that are pending at this point in time are required, but are, of course, not known since the point $t_{k+1}$ is in the future. According to the invention, it is provided in this case, that, on the second calculating unit, a—prospective—state variable $x_P$ of the physical process required for calculating the prospective state variables $x_{M,i}$ of the process model is obtained using extrapolation from the previous state variables of the physical process.

In the case that both the explicit integration method on the first calculating unit and the implicit integration method on the second calculating unit terminate behind schedule, it is provided by a further advantageous embodiment of the invention that in order to calculate the state variables $x_M$ of the process model, these state variables are calculated by extrapolation using the previous values of the determined state variables $x_M$ of the process model. It is thus ensured that in the method according to the invention, state variables are always available or, respectively, can be made available for the required sample points.

According to a further advantageous embodiment of the invention, the process model is parallelized on the second calculating unit and at least one of a further third calculating unit for processing with the implicit integration method and the state variables $x_{M,i}$ of the process model are calculated on the parallelized second and at least additional third calculating unit. The problem of solving a linked system of equations, as, for example, is the case in implicit integration methods can be comparably easily parallelized, wherein methods are known from the prior art that automatically carry out this parallelization. Using parallelization, the possibility of operating the implicit integration method arises with a very high accuracy, which in case of doubt, is more involved than the simultaneously operated explicit integration method.

Furthermore, the object derived and disclosed above is met using a simulator, in particular an in-the-loop simulator, for real-time calculation of state variables of a process model having a first calculating unit, at least a second calculating unit and a process interface, wherein at least one state variable of a physical process can be received by the simulator using the process interface and at least one output variable can be issued from the simulator for controlling the physical process, by designing the simulator in such a manner that the previously described methods can be carried out using it. In comparison with state of the art simulators, such a simulator is capable of calculating state variables with a higher precision by simultaneously assuring real-time capabilities. The simulator can test systems under test, e.g. electronic control units, with more demanding scenarios than it is currently possible.

In detail, there are different possibilities for embodying and further developing the method according to the invention and the simulator according to the invention. Please refer, in this case, to the dependent claims and to the description of preferred embodiments in connection with the drawings.

DESCRIPTION OF A PREFERRED EMBODIMENT

Figure 1:
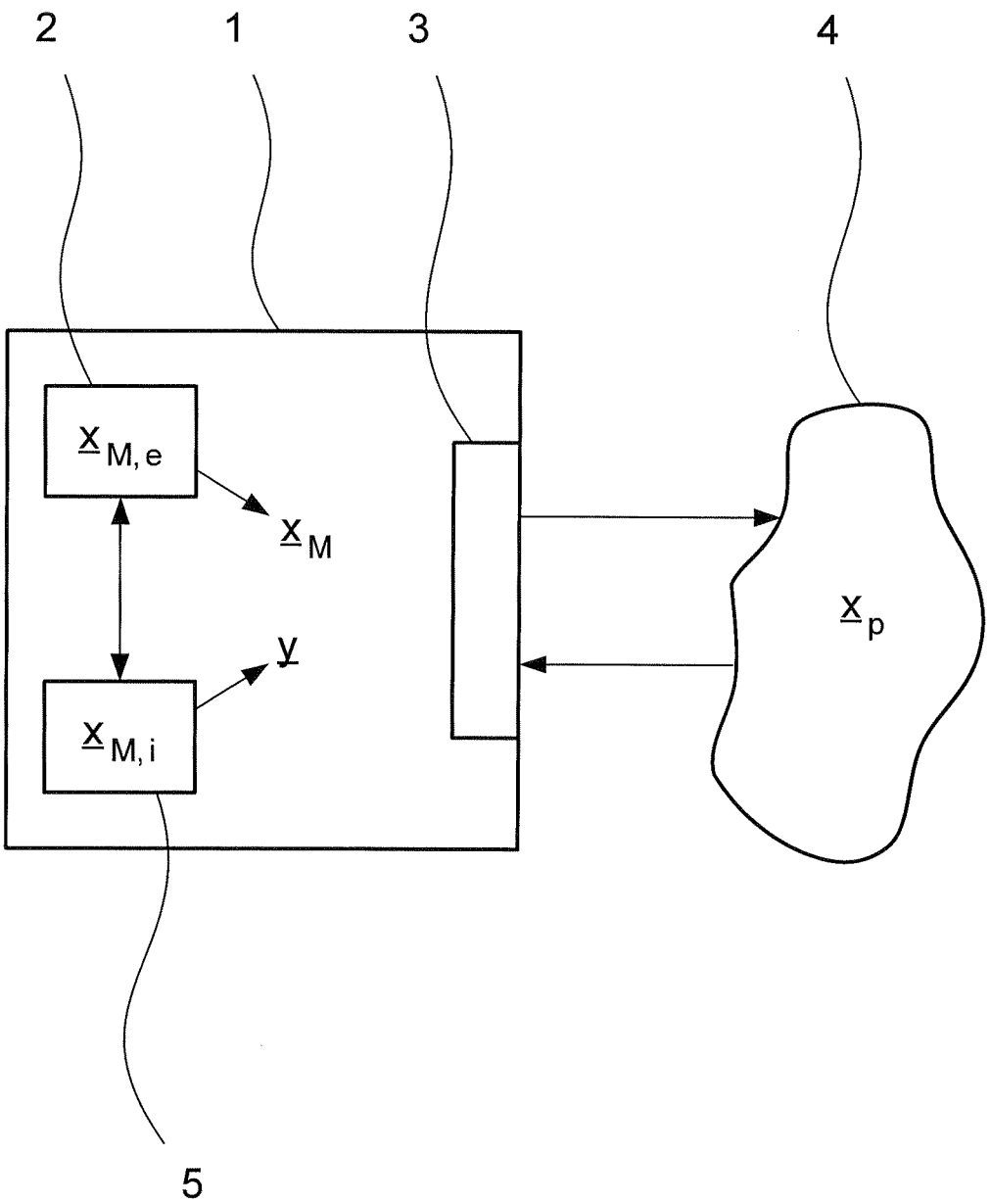
FIG. 1 a process computer linked with a physical process, as well as a simulator corresponding thereto, FIG. 2 an exemplary, schematic overview of possible operation times for the explicit integration method and the implicit integration method on a first calculating unit and on a second calculating unit, as well as the application of the calculated state variables, FIG. 3 a further, exemplary, schematic overview of the operation times for the explicit integration method and the implicit integration method on a first calculating unit and on a second calculating unit, as well as an alternative application of the calculated state variables, and FIG. 4 a schematic representation of the calculation of prospective state variables of the physical process using extrapolation.

FIG. 1 shows a process computer 1 or, respectively a simulator 1, with a first calculating unit 2 and a process interface 3 in a schematic representation. Further—also necessary—details of the process computer 1, as well as e.g. a memory and a data bus linking the first calculating unit 2 with the memory, are not shown here, and are also not important for understanding the present invention.

The process computer 1 is designed in such a manner, that at least one state variable $x_P$ of a physical process 4 is received by the process computer via the process interface 3 and at least one output variable y is determined for the process computer to control the physical process 4, wherein the process model is calculated by the first calculating unit 2 using an explicit integration method for determining the state variables $x_{M,e}$.

As is extensively described above, the sole application of an explicit integration method, in particular in the calculation of state variables of a stiff process model, is problematic under real-time conditions, since the step sizes for guaranteeing a certain accuracy have to be kept so small, that the calculations, in some circumstances, can no longer be carried out under real-time conditions.

Figure 2:
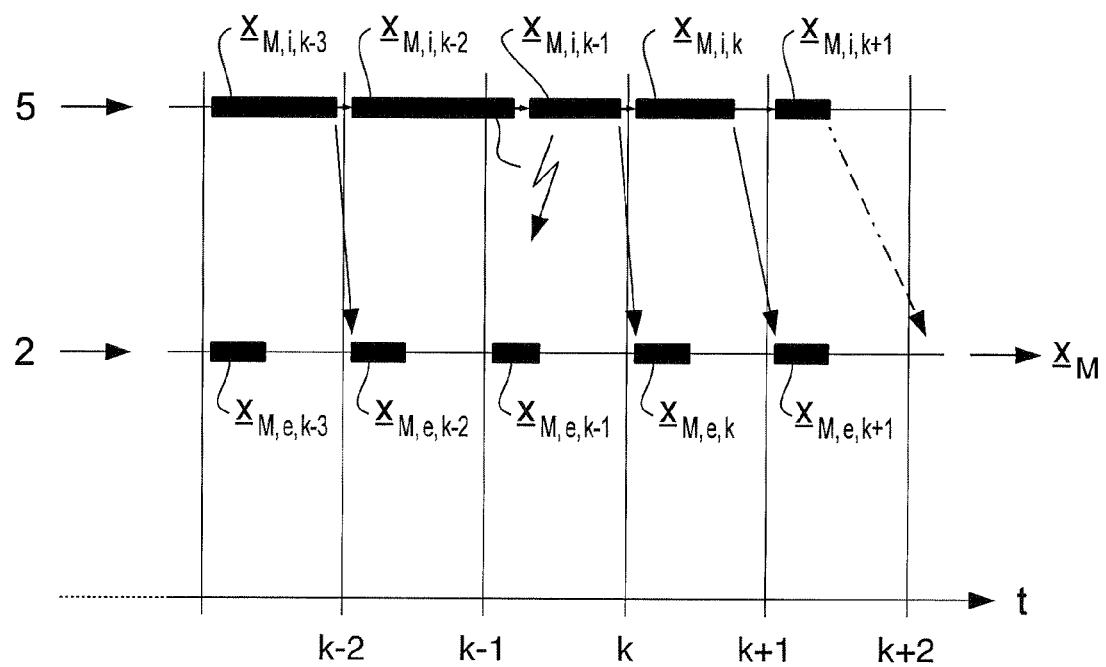

A first method solving this problem and shown in FIG. 2 is characterized in that a second calculating unit 5 is provided, the process model is carried out with the second calculating unit using an implicit integration method essentially simultaneously with the calculation of the process model with the first calculating unit, the state variables of the process model calculated with the second calculating unit and the implicit method are used as a basis for correcting the calculations of the process model carried out on the first calculating unit and the state variables determined in this manner with the explicit integration method are used as state variables of the process model.

In the process computer shown in FIG. 1, a first calculating unit 2 and a second calculating unit 5 represent two separate cores of a multicore processor; in other embodiments not shown here, the first calculating unit 2 and the second calculating unit 5 represent two separate processors in a multiprocessor system. The calculating unit 2 and the calculating unit 5 both access a common memory, from which data are exchangeable, such as calculated state variables. This is not shown in detail in FIG. 1.

In the embodiment shown in FIG. 1, the correction of state variables $x_{M,e}$ determined with the explicit integration method is realized in that previous state variables $x_{M,i}$ calculated by the second calculating unit are used for calculating the current state variables $x_{M,e}$ with the first calculating unit—insofar as they are available. This method is shown in detail in FIG. 2. The time line is classified in integration step sizes simplified as k−2, k−1, k, k+1, and k+2. The corresponding state variables $x_{M,e}$ calculated by the first calculating unit 2 and the state variables $x_{M,i}$ calculated by the second calculating unit 5 are shown.

As can be seen from the marked arrows, the state variables calculated with the help of the implicit integration method are used for calculating prospective state variables with the explicit integration method on the first calculating unit 2. This does not occur only when the implicit integration method carried out on the second calculating unit 5 is not duly terminated, which is the case in the time slice between points k−2 and k−1 in FIG. 2. In this case, the state variables $x_{M,i,k-2}$ emerging from the explicit integration method are used by the explicit integration method for calculating the state $x_{M,e,k-1}$. Fundamentally, the explicit integration method always delivers the state variables $x_{M,e}$ that are used as state variables $x_M$ of the process model. Thus, the real-time capability of the calculation is guaranteed in total with a high reliability.

Figure 3:
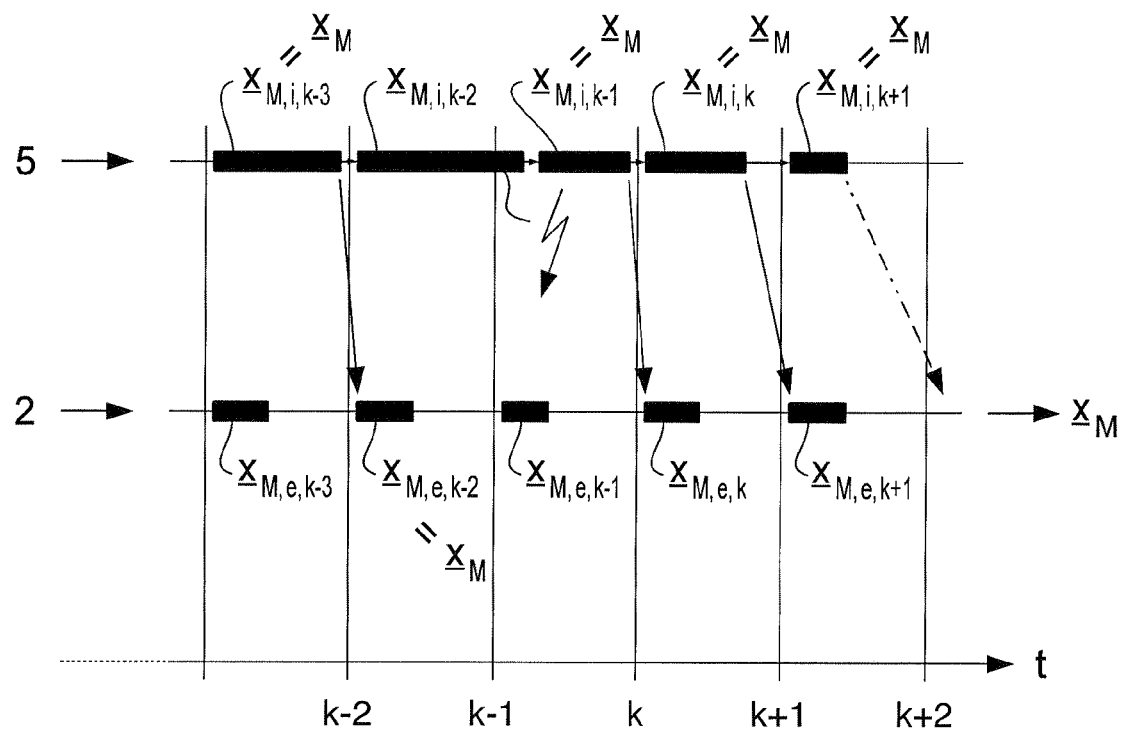

A further method for the real-time calculation of state variables $x_M$ of a process model is shown in FIG. 3, which is characterized firstly in that a second calculating unit 5 is provided. The process model is carried out with the second calculating unit 5 using an implicit integration method essentially simultaneously with the calculation of the process model with the first calculating unit 2 and the state variables $x_{M,i}$ calculated with the second calculating unit 5 and the implicit method are used as state variables xM of the process model, insofar as the state variables $x_{M,i}$ calculated with the second calculating unit 5 and the implicit method exist in real time. Otherwise, the state variables $x_{M,e}$ calculated with the explicit integration method are used as the state variables $x_M$ of the process model.

Which of the two calculating units finally provides the calculated state data for the process model depends, here, upon whether the implicit integration method operated on the second calculating unit 5 is duly terminated or not. It can be seen in FIG. 3, that, in the calculating intervals before points k−2, k, k+1 and k+2, in each case, the second calculating unit provides state variables $x_{M,i}$ calculated using the implicit integration method as state variable $x_M$ of the process model and only in the time slice before point k−1 are state variables $x_{M,e}$ determined using the explicit integration method on the first calculating unit used as state variables $x_M$ of the process model.

It can further be seen in the embodiments shown in FIGS. 2 and 3 that the explicit integration method on the first calculating unit is operated using state variables $x_{M,i}$ determined with the implicit integration method, insofar as these are available, i.e. the implicit integration method was duly terminated in the previous calculation step.

It is shown in FIGS. 2 and 3, that the implicit integration method implemented on the second calculating unit is operated with the same calculation step size as the explicit integration method. In other methods not shown here, the step sizes of the implicit integration method are made larger than the step sizes of the explicit integration method. Preferably, the calculation step sizes are kept variable and are adapted to the temporal development of the state variables, namely, small in the case of transient operations and large in the case of steady-state operations with only minimal variations in the state variables.

It was initially shown that implicit integration methods are characterized in that the calculation of state variables of the process model in the next, interested time slice do not depend only on the values of the previous state variables, but on the state variables or, respectively, their derivatives in the interested time slice itself, which is why implicit integration methods require an iterative solution. However, not only the state variables themselves are affected by this characteristic, but also the state variables of the linked physical process. The means, that in order to calculate the interested prospective state variables $x_{M,i,k+1}$, the—prospective—state variables $x_{P,k+1}$ of the physical process are required, which naturally cannot occur.

Figure 4:
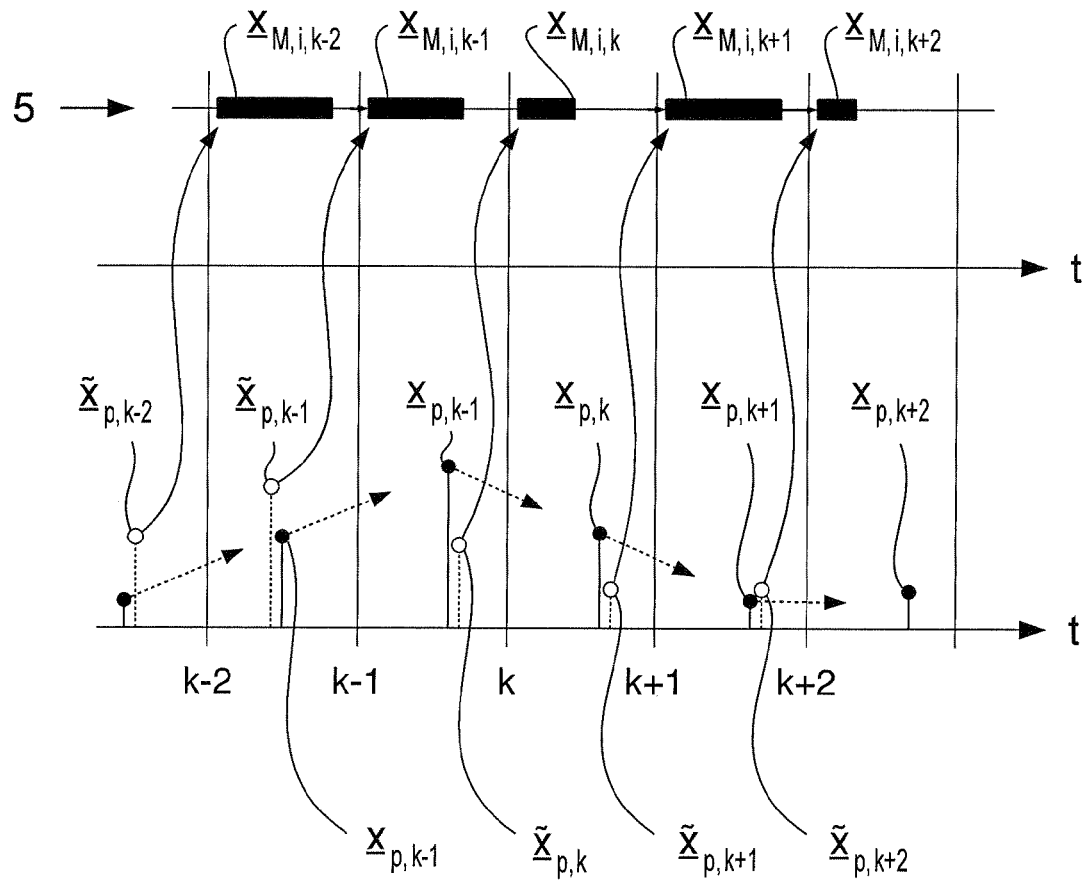

In FIG. 4, it is shown that in this case, the—prospective—state variables $x_{P,k+1}$ of the physical process required for the calculation are obtained using extrapolation from the previous state variables $x_{P,k}$ of the physical process; each of the estimates $x_{P,k-2}$, $x_{P,k-1}$, $x_{P,k}$, $x_{P,k+1}$, $x_{P,k+2}$ is obtained using extrapolation, which—each indicated using a curved arrow—are used for calculating the state variables $x_{M,i}$.

The invention claimed is:

1. A method for real-time calculation of state variables ($x_M$) of a process model on a process computer having a first calculating unit and a process interface, wherein the process computer is designed so that at least one state variable ($x_P$) of a physical process is recorded by the process computer via the process interface and/or at least one output variable (y) is issued by the process computer for controlling the physical process, said method comprising the steps of:

calculating the process model with an explicit integration method by the first calculating unit to determine state variables ($x_{M,e}$) of the process model;

providing a second calculating unit;

calculating the process model with the second calculating unit using an implicit integration method simultaneously with the calculation of the process model with the first calculating unit;

using any available previous state variables ($x_{M,e}$) of the process model calculated with the second calculating unit and the implicit method as a basis for calculating the current state variables ($x_{M,e}$) of the process model with the first calculating unit, and using the current state variables ($x_{M,e}$) of the process model so determined with the explicit integration method as state variables ($x_M$) of the process model such that the explicit integration method is preferred over the implicit integration method.

2. A method for real-time calculation of state variables ($x_M$) of a complete process model on a process computer having a first calculating unit and a process interface, wherein the process computer is designed so that at least one state variable ($x_P$) of a physical process is received by the process computer via the process interface and/or at least one output variable (y) is issued by the process computer for controlling the physical process, said method comprising the steps of:

calculating the complete process model with an explicit integration method by the first calculating unit to determine state variables ($x_{M,e}$);

providing a second calculating unit;

calculating the process model with the second calculating unit using an implicit integration method simultaneously with the calculation of the process model with the first calculating unit, and using state variables ($x_{M,i}$) calculated on the second calculating unit and the implicit method as state variables ($x_M$) of the complete process model if the state variables ($x_{M,i}$) exist in real time and, if they do not, using the state variables ($x_{M,e}$) calculated with the explicit integration method as the state variables ($x_M$) of the complete process model, said explicit integration method serving as a back-up for calculating the complete process model if the implicit integration method fails to provide the complete process model in real time.

3. The method according to claim 1 or 2, wherein the implicit integration method implemented on the second calculating unit works at least partially with a larger sample step size than the explicit integration method implemented on the first calculating unit with a variable sample step size.

4. The method according to claim 3, wherein state variables ($x_{M,i}$) lying between two calculated sample points are calculated on the second calculating unit using a polynomial approximation function of the process model or parts thereof using a dense output method.

5. The method according to claim 1 or 2, wherein in the second calculating unit, a prospective state variable ($x_P^{k+1}$) of the physical process required for calculating the prospective state variables ($x_{M,i}^{k+1}$,) of the process model is obtained using extrapolation from previous state variables of the physical process.

6. The method according to claim 1 or 2, wherein should the calculations carried out by the first calculating unit and the second calculating unit be incomplete, in order to calculate the state variables ($x_M$) of the process model, these state variables ($x_M$) are calculated by extrapolation using previous values of the determined state variables ($x_M$) of the process model.

7. The method according to claim 1 or 2, wherein the process model is parallelized on the second calculating unit and at least one further, third calculating unit for processing with the implicit integration method and the state variables ($x_{M,i}$) of the process model are calculated on the parallelized second and at least another third calculating unit.

8. A simulator for real-time calculation of state variables ($x_M$) of a process model having a first calculating unit, at least a second calculating unit and a process interface, wherein at least one state variable ($x_P$) of a physical process is recorded by the simulator using the process interface and at least one output variable (y) is issued from the simulator for controlling the physical process, wherein the simulator is designed in such a manner, that a method according to claim 1 or 3 is carried out therewith.

* * * * *

UNITED STATES PATENT AND TRADEMARK OFFICE
CERTIFICATE OF CORRECTION

PATENT NO.        : 8,428,914 B2
APPLICATION NO.   : 12/185203
DATED             : April 23, 2013
INVENTOR(S)       : Jorg Frochte It is certified that error appears in the above-identified patent and that said Letters Patent is hereby corrected as shown below:

In the Claims:

Col. 10, line 20 should read:
such a manner, that a method according to claim 1 or ~~3~~ 2 is Signed and Sealed this
Second Day of July, 2013

Teresa Stanek Rea
*Acting Director of the United States Patent and Trademark Office*